United States Patent [19]

Eisen et al.

[11] Patent Number: 5,440,678

[45] Date of Patent: Aug. 8, 1995

[54] METHOD OF AND APPARATUS FOR CREATING A MULTI-MEDIA FOOTNOTE

[75] Inventors: Ivan Eisen, Flower Mound; Frank Fandrick, Richardson; Stephen W. Murphrey, Highland Village; Shrikant N. Parikh, Mesquite, all of Tex.

[73] Assignee: International Business Machines Corporation, Armonk, N.Y.

[21] Appl. No.: 305,498

[22] Filed: Sep. 13, 1994

Related U.S. Application Data

[63] Continuation of Ser. No. 918,866, Jul. 22, 1992, abandoned.

[51] Int. Cl.⁶ .............................................. G06F 15/62
[52] U.S. Cl. ................................................... 395/154
[58] Field of Search ............................... 345/144–147, 345/154, 155, 157, 159, 161, 600, 116; 364/419; 358/183

[56] References Cited

U.S. PATENT DOCUMENTS

| | | | |
|---|---|---|---|
| 4,513,390 | 4/1985 | Walter et al. | 395/275 |
| 4,599,611 | 7/1986 | Bowker et al. | 345/116 |
| 4,982,344 | 1/1991 | Jordan | 395/157 |
| 5,097,349 | 3/1992 | Nomura et al. | 358/335 |
| 5,367,621 | 11/1994 | Cohen et al. | 395/154 |

FOREIGN PATENT DOCUMENTS

| | | |
|---|---|---|
| 846349 | 6/1982 | European Pat. Off. . |
| 170521 | 12/1984 | European Pat. Off. . |

OTHER PUBLICATIONS

Kinata et al, "Working With Word," 1989, pp. 421–426.
"Using FullWrite Professional", 1990, pp. 1–5 thru 1–7.
Sasnett, "Reconfigurable Video", Optical Information Systems, 1986, pp. 213–218.
Barker, B. A., et al. Creating a Footnote for a Table or Graphic Object. IBM TDB, vol. 27, No. 10B, Mar. 1985, p. 5966.
Baker, R. L. Direct Manipulation of Hypermedia Links. IBM TDB, Jun. 1991, pp. 252–253.
Barker, B. A., et al. Footnotes Belonging to Object Sets. IBM TDB, vol. 27, No. 10B, Mar. 1985, p. 5969.
Farker, B. A., et al. Footnoting in a Text Editor. IBM TDB, vol. 27, No. 10B, Mar. 1985, pp. 6008–6009.
Pascoe, R. A. Annotation and Footnoting in an Object Based Data Stream. Jun. 1985, No. 254, Kenneth Mason Pub Ltd, England.
Repass, J. T., et al. Footnote and Text Create/Revise Operations. IBM TDB, vol. 25, No. 12, Mar. 1983, p. 6479.
Repass, J. T., et al. Footnote Reference Revision. IBM TDB, vol. 25, No. 12, May 1983, p. 6481.

*Primary Examiner*—Heather R. Herndon
*Assistant Examiner*—Michael Smith
*Attorney, Agent, or Firm*—A. Bruce Clay

[57] ABSTRACT

A multi-media footnote control links a reference and a video. During the viewing of a video by an author/editor thereof, a footnote may be added to properly credit another source and to aid in study of the subject presented on the video. At the appropriate place in the video, the author/editor stops the video and displays a create footnote window. The author will then enter the appropriate data into the window. The footnote data will then be automatically passed to the video in the predetermined position. The footnote will be displayed in a footnote area during the running of the video. If a user/author of the video wishes to review the footnoted reference, the video may be stopped and by indicating the footnote such as with a mouse, the reference will be displayed in a separate window.

10 Claims, 5 Drawing Sheets

METHOD OF AND APPARATUS FOR CREATING A MULTI-MEDIA FOOTNOTE

The application is a continuation, of application Ser. No. 07/918,866, filed Jul. 22, 1992, now abandoned.

CROSS REFERENCES TO THE INVENTION

This application is related in subject matter to the following applications filed concurrently herewith and assigned to a common assignee:

Application Ser. No. 918,479 filed by I. Eisen and S. Murphrey entitled, Method and Apparatus for Multi-Media Footnote Control Created Through User Input, application Ser. No. 918,865 filed by I. Eisen and S. Murphrey entitled, Method and Apparatus for Automatically Building Bibliographies in a Multi-Media Environment, and application Ser. No. 918,502 filed by I. Eisen and S. Murphrey entitled, Dynamically Created Footnote Control Using a Media Development System.

The foregoing co-pending applications are incorporated herein by reference.

TECHNICAL FIELD OF THE INVENTION

The present invention relates in general to computer software, and in particular to a method and apparatus for creating multi-media footnotes in video.

BACKGROUND OF THE INVENTION

With the advent of multi-media computer systems, video has become an increasingly popular technique for creating and presenting professional works. While written published works allow the reader to enhance understanding of the material through the use of footnotes, there currently is no way to create multi-media enabled footnotes in on-line full-motion video files. Currently, the only known way to indicate credits in a full-motion video is the standard listing of credits either at the end of the video or in some intermediate position. However, these credits are not linked to any source document and it is not possible to call-up and view the source documents on-line. Thus, there is a need for a method and apparatus which allows the insertion of footnotes in video and the ability to call-up and view the footnoted source material.

SUMMARY OF THE INVENTION

The present invention provides a method and apparatus for creating a multi-media footnote control in video data which substantially eliminates or reduces the problems of the prior art. The present invention provides enhanced research capability to the use of multi-media programming.

In accordance with one aspect of the present invention, a method of creating a multi-media footnote control in video data on-line in a computer system is provided. The video and the reference are first linked. Footnote data is then entered by any appropriate manner in a create footnote window. The data is then automatically passed to the video and positioned in a predetermined area of the video. The footnote thus created will be displayed at a predetermined time for a predetermined length of time when the video is subsequently run. By clicking on the created footnote, the reference material will be displayed for separate review.

It is a technical advantage of the present invention that footnotes may be added to video data to enhance a user's understanding thereof. It is a further technical advantage that the footnoted reference may be called-up for review by the user.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
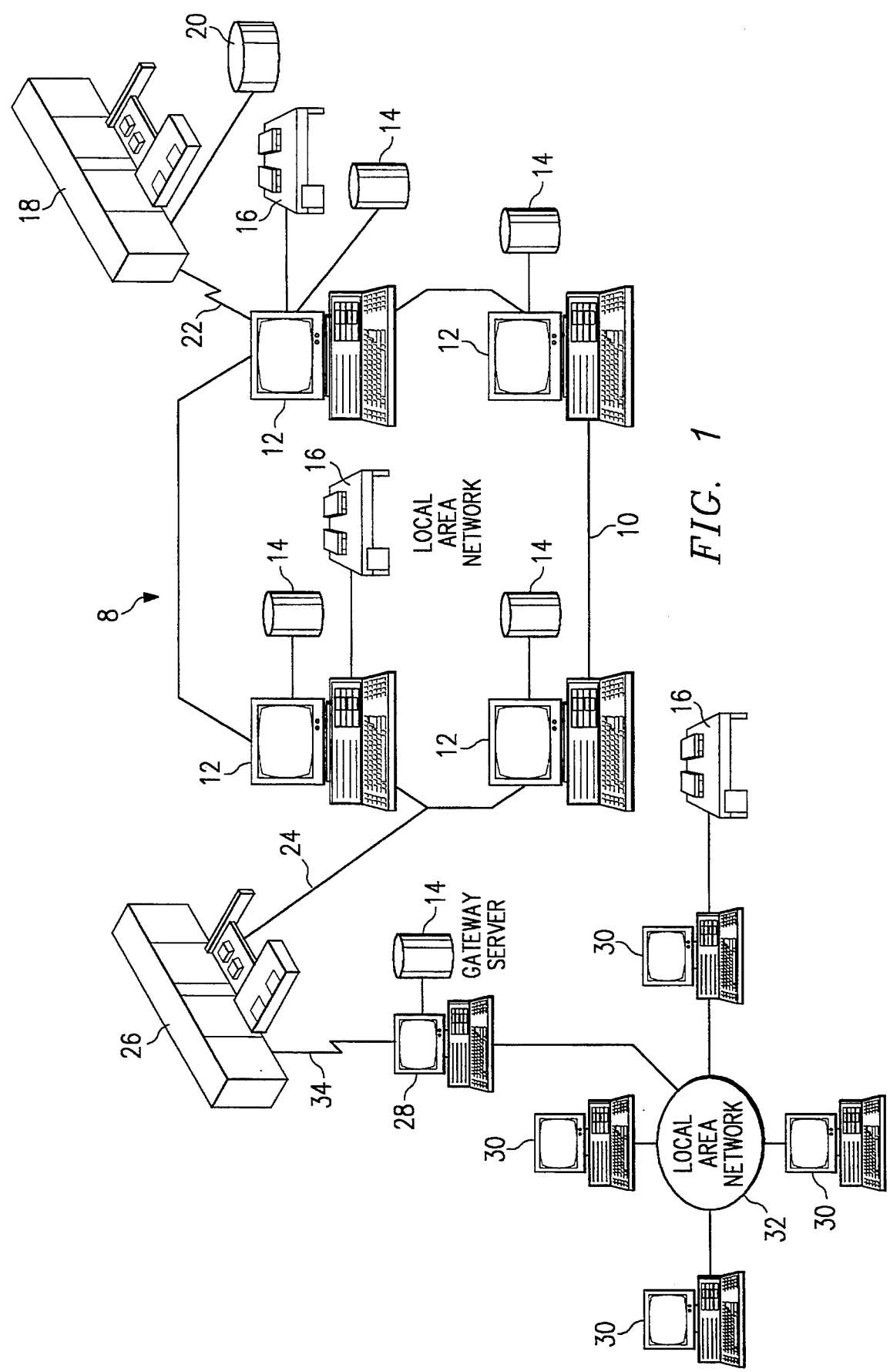
FIG. 1 is a schematic illustration of a data processing system in accordance with the present invention.

Referring to FIG. 1, there is depicted a graphical representation of a data processing system 8, which may be utilized to implement the present invention. As may be seen, the data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10. As discussed above with respect to LAN 32 and LAN 10, a plurality of documents or resource objects may be stored within storage device 20 and controlled by mainframe computer 18, as resource manager or library service for the resource objects thus stored. Of course those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2:
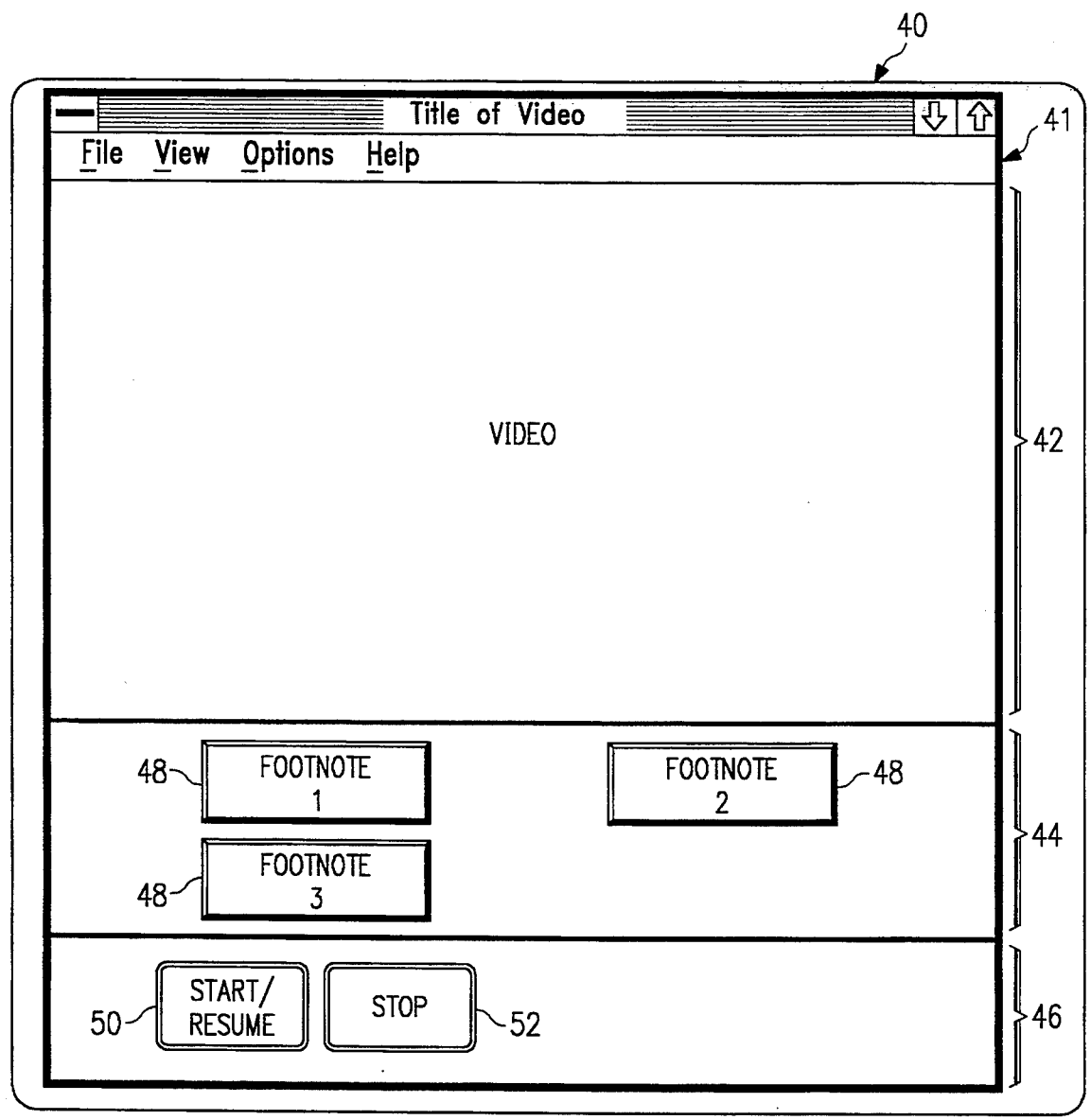
FIG. 2 is an illustration of the present invention as it would appear to an end user.

Referring to FIG. 2, a graphical representation of the present invention as viewed by an end user is shown. The end user views a multimedia presentation in a window 41 on a screen 40, such as is found on the individual computers 12 and 30 (see FIG. 1). The window 41 is divided into a video area 42, a footnote area 44, and a control area 46. While the video in the video area 42 runs, any material that is footnoted is indicated by footnote numerals 1, 2, and 3, as indicated by reference numeral 48 in the footnote area 44. Controls are provided in the control area 46 for use by an end user to control the viewing of the video in the video area 42. For example, a start/resume button 50 and a stop button 52 may be provided. Thus, while viewing the video, an end user may be presented with the footnote 1, 2, or 3 as indicated by reference numeral 48 in the footnote area 44. The end user could then activate the stop push-button 52 which would stop the video. The end user could then activate any of the footnotes 48 by any appropriate method such as clicking on them with a mouse, and be presented with a screen (not shown in FIG. 2) that would display the reference material therein. It is to be understood that the reference material may comprise a written document, video, audio or any combination thereof.

Figure 3:
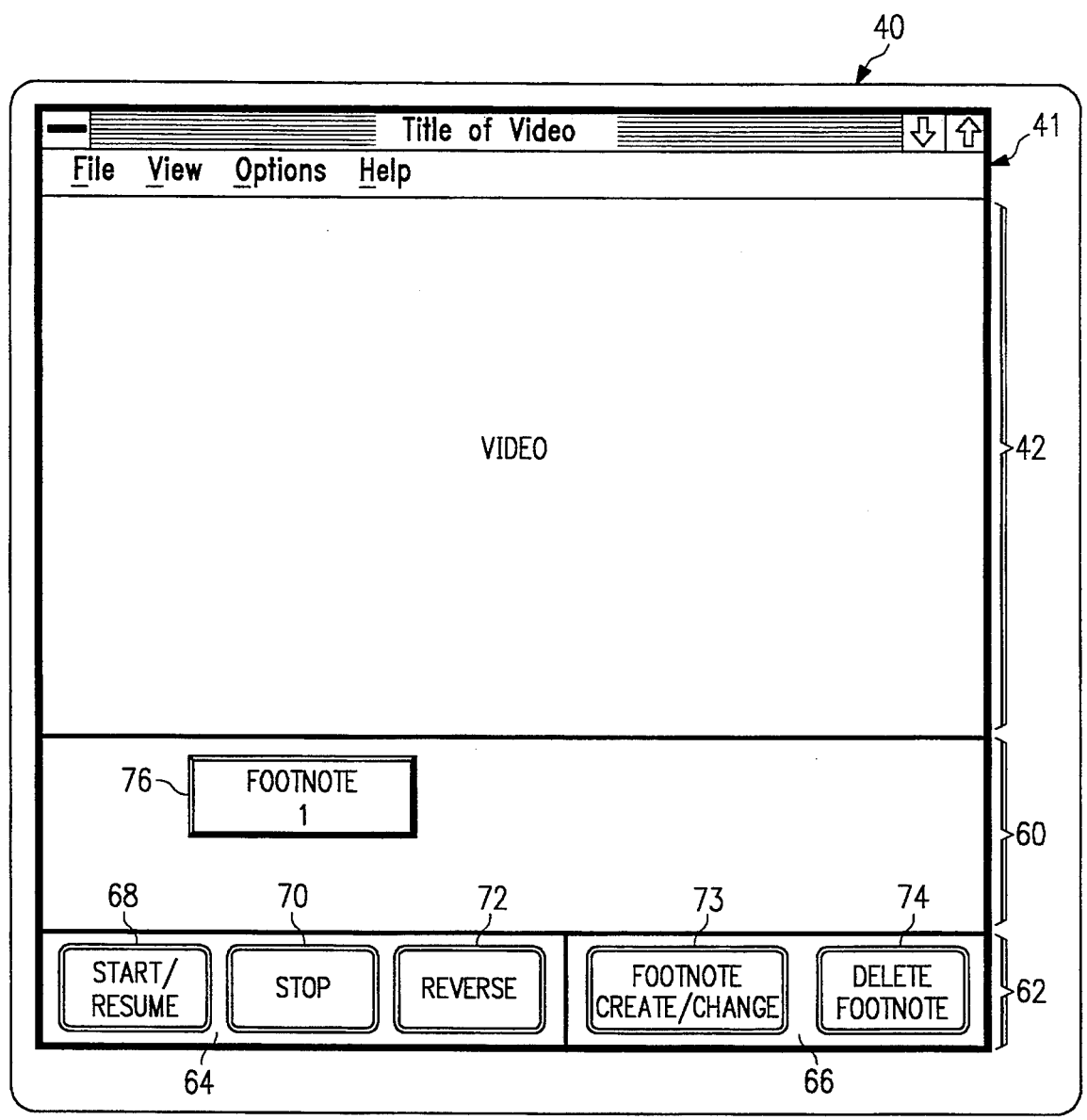
FIG. 3 is an illustration of the present invention in use by an author/editor.

Referring to FIG. 3, the window 41 is shown with the footnote development of the present invention displayed thereon. When an author/user wants to create or edit footnotes in a video, the video is shown in the video area 42 with a footnote create/edit area 60 and a control/create area 62.

The control/create area 62 comprises a control area 64 and a create area 66. For example, the control area 64 contains a start/resume button 68, a stop button 70 and a reverse button 72. The create area 66 contains, for example, a footnote create/change button 73 and a delete footnote button 74. The footnote creation area 60 contains existing footnote 76 and additional space for the insertion of additional footnotes.

While viewing a video in the video area 42, an author/user may want to insert/edit a footnote for a specific portion thereof. The end user would stop the video by depressing the stop push-button 70 (and then reversing the video by depressing reverse push-button 72, if necessary) and then depress either the footnote create/change push-button 73 or the delete footnote push-button 74. To delete a footnote, the author/user would place a cursor over the existing footnote and then depress the delete footnote push-button 74. To create/change a footnote, the author would depress the footnote create/change push-button 73.

Figure 4:
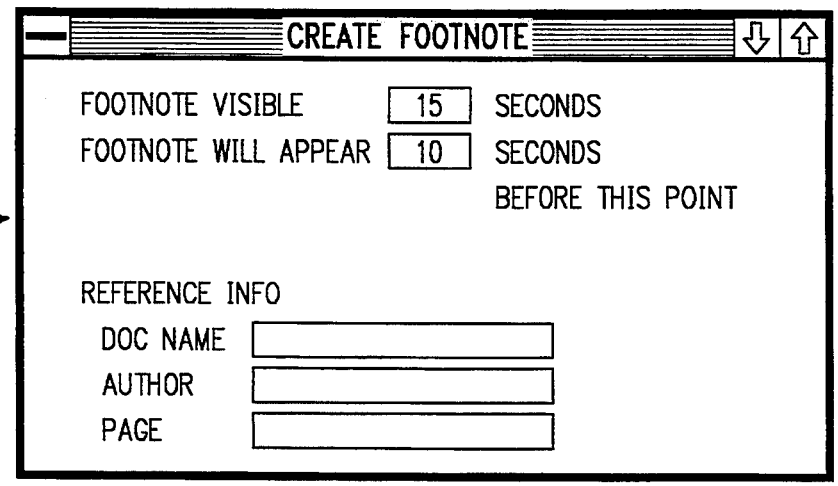
FIG. 4 is an illustration of one embodiment of a window allowing footnote creation/changing.

By depressing push-button 73, a create footnote window 80 (see FIG. 4) would appear. If an existing footnote such as the existing footnote 76 (see FIG. 3) were to be edited, the appropriate information regarding footnote 76 would appear in the create footnote window 80 as a result of the cursor being placed over footnote 76. The author would then be able to edit the information as desired in the window 80. However, if a new footnote is to be created, the create footnote window 80 would appear with blanks in each data area. The author would then fill in the blanks as required using any appropriate method, such as keying in or dragging the data, and enter the information to create the new footnote. The create footnote window 80 may contain such information, for example, as the duration the footnote is to be available, when the footnote will appear, and multi-media reference information such as document name, author, page, and, etc. As previously stated above, once the author has the appropriate information within the blanks in window 80, it is necessary to enter the information to create the new footnote.

Figure 5:
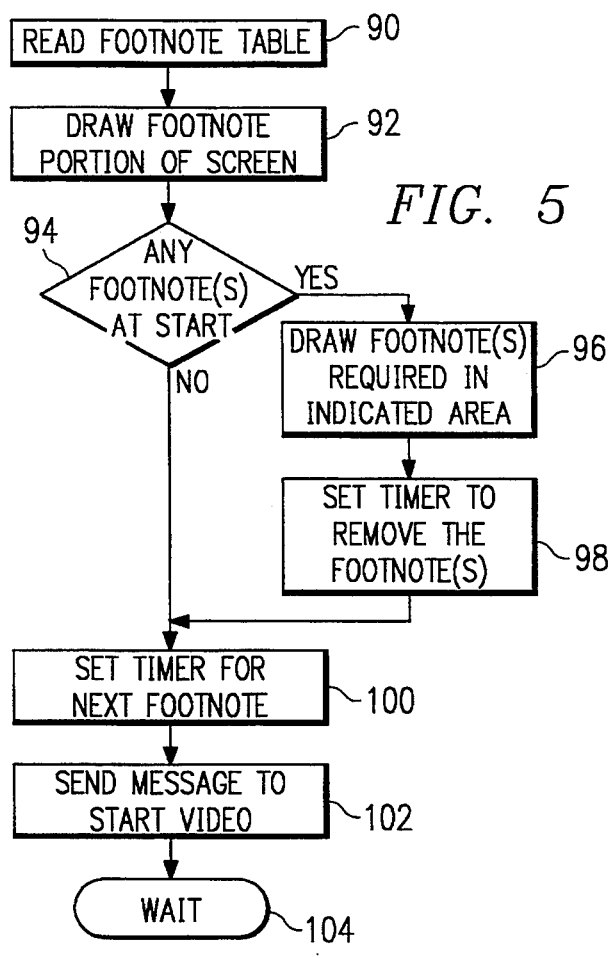
FIG. 5, FIG. 6, FIG. 7 and FIG. 8 are flowcharts illustrating the operation of the present invention.

Referring to FIG. 5, a flowchart of the present invention is illustrated for the start-up sequence thereof. At block 90, a footnote table is read. A footnote table (not shown) must be created during the development stage of the present invention, as will be subsequently described in greater detail (see FIG. 10). At block 92, the footnote portion of the screen is drawn. At decision block 94, it is determined whether or not any footnotes are present at the start of the video. If the response to decision block 94 is yes, the required footnotes are drawn in the indicated area at block 96. The footnotes are drawn in the indicated area based upon space within the footnote area. For example, the first footnote may be presented in the upper left-hand corner of the footnote area and subsequent footnotes can be added in any prescribed manner. At block 98, a timer is set according to the footnote table for removal of the footnotes. If the response to decision block 94 is no and/or subsequent to block 98, a timer is set for the next footnote in accordance with the footnote table at block 100. At block 102, a message is sent to start the video. The present invention then waits at 104.

Figure 6:
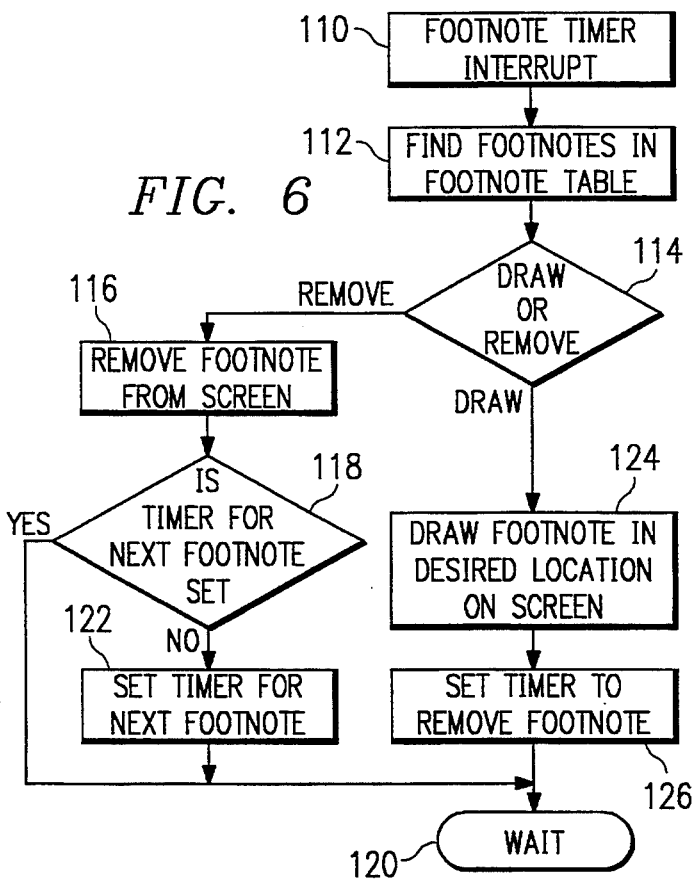

Referring to FIG. 6, the flow of the present invention during the viewing of a video is illustrated. At block 110, a footnote timer is interrupted. At block 112, the appropriate footnotes are found in the footnote table. At decision block 114 it is determined whether to draw or remove a footnote. If the response to decision block 114 is remove, the footnote is removed from the screen at block 116. It is then determined at decision block 118 whether or not the timer is set for the next footnote. If the response to decision block 118 is yes, the present invention waits at 120. If the response to decision block 118 is no, a timer is set for the next footnote at block 122 followed by waiting at 120. If the response to decision block 114 is draw, the footnote is drawn in the desired location at block 124. All footnotes are automatically positioned and/or repositioned based upon the number of footnotes present and their order of appearance. A timer is then set to remove the footnote at block 126 followed by waiting at 120.

Figure 7:
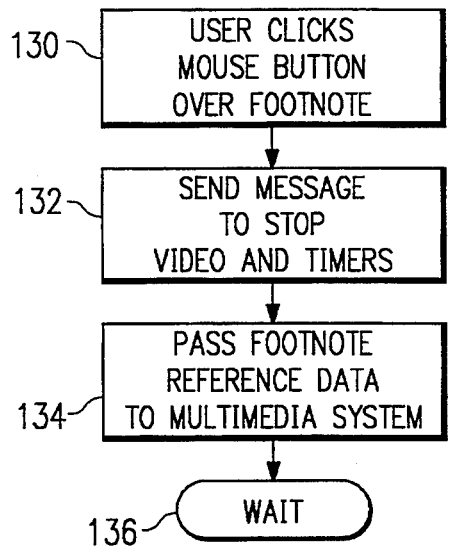

Referring next to FIG. 7, the flow of the present invention is illustrated in the case in which a user wants to see a footnote reference displayed. At block 130, the user clicks a mouse button over the footnote. At block 132, a message is sent to stop the video and the timers. At block 134 the footnote reference data is passed to the multi-media system which opens the reference and shows it to the viewer. The reference can be left on or closed when the viewer is finished with a review thereof. The present invention then waits at 136.

Figure 8:
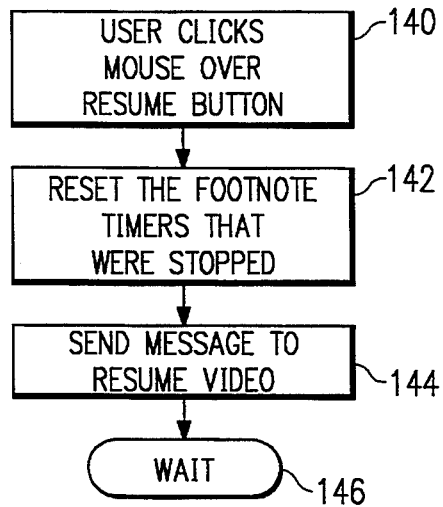

Referring to FIG. 8, the flow of the present invention after having stopped the video for any reason is illustrated. At block 140, the user clicks the mouse over the resume button. At block 142, the footnote timers that were stopped are reset. At block 144, a message is sent to resume the video and the present invention waits at 146.

Figure 9:
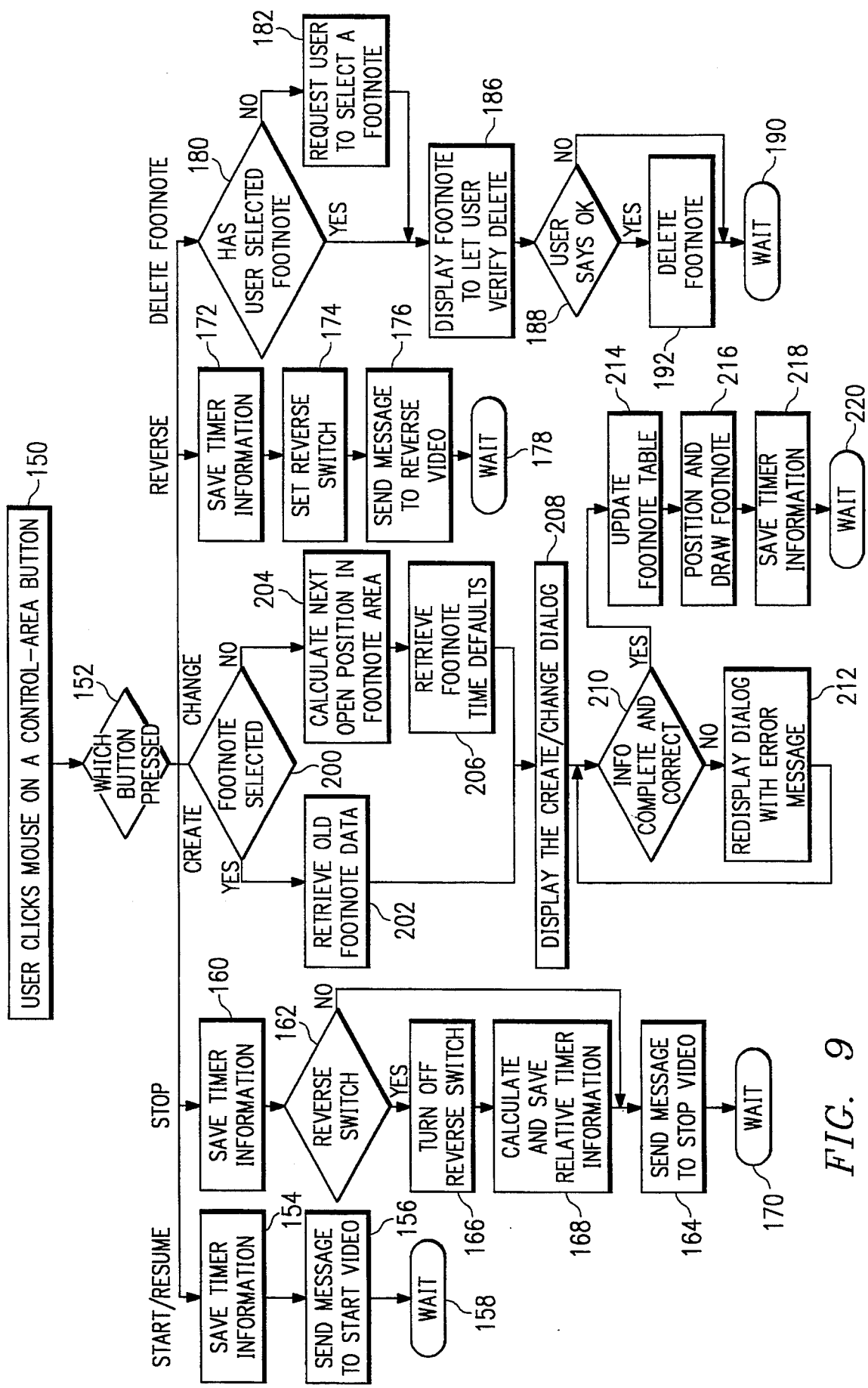
FIG. 9 is a flowchart illustrating footnote development, including the creation/change of a footnote in accordance with the present invention.

Referring to FIG. 9, the flow of the present invention is illustrated for development of a footnote. At block 150, the user clicks the mouse on a control area button. At decision block 152 it is determined which button was pressed. If the start/resume button was pressed, timer information is saved at block 154. A message is then sent to start the video at block 156. The present invention then waits at 158.

If it is determined at decision block 152 that the stop push-button was pressed, timer information is saved at block 160. It is then determined at decision block 162 whether or not the reverse switch had been depressed previously (i.e. was the video going forward or in reverse). If the response to decision block 162 is no, a message is sent to stop the video at block 164. If the response to decision block 162 is yes, the reverse switch is turned off at block 166. At block 168, relative timer information is calculated and saved. A message is then sent to stop the video at block 164. The present invention then waits at 170.

If it is determined at decision block 152 that the reverse push-button was pressed, timer information is saved at block 172. At block 174 the reverse switch is set. At block 176 a message is sent to reverse the video. The present invention then waits at 178.

If it is determined at decision block 152 that the delete footnote button was pressed, it is determined at decision block 180 whether or not a footnote has been selected. If the response to decision block 180 is no, the user is requested to select a footnote at block 182. If the response to decision block 180 is yes, and after block 182, the footnote is displayed to allow the user to verify deletion thereof at block 186. At decision block 188, it is determined whether or not the user indicates that deletion is to proceed. If the response to decision block 188 is no, the present invention waits at 190. If the response to decision block 188 is yes, the footnote is deleted at block 192. The present invention then waits at 190.

If it is determined at decision block 152 that the create/change button was pressed, it is determined whether or not a footnote has been selected at decision block 200. If the response to decision block 200 is yes, old footnote data is retrieved at block 202. If the response to decision block 200 is no, the next open position in the footnote area is calculated for positioning of the new footnote at block 204. The footnote time defaults are then retrieved at block 206. Following block 202 or block 206, the create/change dialog is is displayed at 208. At decision block 210 it is decided whether or not the information is complete and correct. If the response to decision block 210 is no, the dialog is re-displayed with an error message at block 212. The present invention then returns to decision block 210. If the response to decision block 210 is yes, the footnote table is updated at block 214. At block 216, the footnote is positioned and drawn. At block 218, the timer information is saved. The present invention then waits at 220.

As a result of the present invention an author may footnote video in much the same manner as textual matter is footnoted. In addition the linking between multi-media allows the reference material to be displayed by selecting a footnote during the viewing of the video. Thus someone using the video for research will be able to review any reference material on-line while the video is being viewed.

The present invention would be particularly applicable to the demonstration of any skill best presented with video. For example, a surgical procedure could be demonstrated. During the procedure, reference may be made to other procedures which would be footnoted. A viewer of the video would then be able to call up the footnoted reference and read, listen and/or view that material before continuing.

Although the present invention has been particularly shown and described with reference to a preferred embodiment, it will be understood by the those skilled in the art that various changes in form and detail may be made without departing from the spirit and the scope of the invention.

What we claim is:

1. A method of creating a multi-media footnote control in an animated sequence of video images on-line in a computer system, comprising the steps of:
   identifying a relationship between a specific portion of an on-line animated sequence of video images and multi-media reference material pertinent thereto which is stored in a separate on-line source;
   entering identification data from said multi-media reference material in a create footnote window associated with said on-line images;
   automatically passing said entered data to said on-line images to create a footnote, wherein said specific portion of said on-line images and said multi-media reference material are linked together, and said footnote appears during viewing of said on-line images for a predetermined period of time on said specific portion of said on-line images; and
   automatically accessing said separate on-line source and displaying said multi-media reference material for viewing upon selection of said footnote.

2. The method of claim 1, further comprising the step of:
   automatically positioning said footnote in a footnote area of said on-line images.

3. The method of claim 1, wherein the step of entering data comprises:
   displaying said create footnote window; and
   placing said data in predesignated areas of said window.

4. The method of claim 3, wherein the step of placing said data comprises:
   keying in said data.

5. The method of claim 3, wherein the step of placing said data comprises:
   dragging said data with a mouse.

6. A computer system for creating a multi-media footnote control in an on-line animated sequence of video images, comprising:
   means for identifying a relationship between a specific portion of an on-line animated sequence of video images and multi-media reference material pertinent thereto which is stored in a separate on-line source;
   means for entering identification data from said multi-media reference material in a create footnote window associated with said on-line video images;
   means for automatically passing said entered data to said video images to create a footnote, wherein said specific portion of said video images and said multi-media reference material are linked together, and said footnote appears during viewing of said on-line video images for a predetermined period of time on said specific portion of said video images; and
   means for automatically accessing said separate on-line source and displaying said multi-media reference material for viewing upon selection of said footnote.

7. The computer system of claim 6, further comprising:
   means for automatically positioning said footnote in a footnote area of said on-line video images.

8. The computer system of claim 6, wherein said means for entering comprises:
   means for displaying said create footnote window; and
   means for placing said data in predesignated areas of said window.

9. The computer system of claim 8, wherein said means for placing comprises:
   a keyboard.

10. The computer system of claim 8, wherein said means for placing comprises:
    a mouse.

* * * * *